US011429006B2

(12) United States Patent
Yoo et al.

(10) Patent No.: US 11,429,006 B2
(45) Date of Patent: Aug. 30, 2022

(54) SILICON PHOTONICS-BASED OPTICAL TRANSMISSION APPARATUS

(71) Applicant: ELECTRONICS AND TELECOMMUNICATIONS RESEARCH INSTITUTE, Daejeon (KR)

(72) Inventors: Sanghwa Yoo, Daejeon (KR); Heuk Park, Daejeon (KR); Joon Ki Lee, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/377,658

(22) Filed: Jul. 16, 2021

(65) Prior Publication Data

US 2022/0137477 A1    May 5, 2022

(30) Foreign Application Priority Data

Nov. 5, 2020   (KR) .................. 10-2020-0146869
Mar. 24, 2021  (KR) .................. 10-2021-0038009

(51) Int. Cl.
    *G02F 1/21*    (2006.01)
    *G02F 1/225*   (2006.01)

(52) U.S. Cl.
    CPC ............ *G02F 1/212* (2021.01); *G02F 1/2257* (2013.01)

(58) Field of Classification Search
    CPC ........ G02F 1/212; G02F 1/2257; G02F 1/011;
    G02F 1/0113; G02F 1/025; G02F 1/0344;
    G02F 1/035; G02F 1/0356; G02F 1/065;
    G02F 1/07; G02F 1/073; G02F 1/225;
    G02F 1/2255
    See application file for complete search history.

(56) References Cited

U.S. PATENT DOCUMENTS 6,449,080 B1    9/2002  McBrien et al.
7,536,066 B2 *  5/2009  Kato .................. G02B 6/43
                                              385/14

(Continued)

FOREIGN PATENT DOCUMENTS

JP    WO2017/159651 A1    9/2017

OTHER PUBLICATIONS

Po Dong et al., "Coplanar-waveguide-based silicon Mach-Zehnder modulator using a meandering optical waveguide and alternating-side PN junction loading", Optics Letters, vol. 41, No. 18, pp. 4401-4404, 2016.

*Primary Examiner* — John Bedtelyon
(74) *Attorney, Agent, or Firm* — LRK Patent Law Firm (57) ABSTRACT

Disclosed is a silicon photonics-based optical transmission apparatus. The apparatus includes an optical modulator chip of a ground-signal-ground (GSG) electrode array including two phase shifters for differential driving, a sub-substrate including a metal electrode of a periodic pattern to connect two ground metal electrodes to each other at a GSG electrode connected to each of the two phase shifters, and a solder bump having a same periodic pattern as the metal electrode of the sub-substrate to connect the ground metal electrodes of the optical modulator chip and the metal electrode of the periodic pattern of the sub-substrate.

19 Claims, 4 Drawing Sheets

(56) References Cited

U.S. PATENT DOCUMENTS

| | | | |
|---|---|---|---|
| 8,712,195 B2* | 4/2014 | Sugiyama | G02F 1/035 |
| | | | 359/254 |
| 9,568,751 B2* | 2/2017 | Kanno | G02F 1/0356 |
| 10,558,063 B2* | 2/2020 | Sugaya | G02F 1/0327 |
| 10,996,537 B2* | 5/2021 | Davies | G02F 1/2255 |
| 2012/0063714 A1 | 3/2012 | Park et al. | |
| 2017/0168371 A1 | 6/2017 | Kim et al. | |
| 2020/0004055 A1 | 1/2020 | Ding et al. | |

* cited by examiner

SILICON PHOTONICS-BASED OPTICAL TRANSMISSION APPARATUS

CROSS-REFERENCE TO RELATED APPLICATION(S)

This application claims the priority benefit of Korean Patent Application No. 10-2020-0146869 filed on Nov. 5, 2020, and Korean Patent Application No. 10-2021-0038009 filed on Mar. 24, 2021, in the Korean Intellectual Property Office, the disclosures of which are incorporated herein by reference for all purposes.

BACKGROUND

1. Field

One or more example embodiments relate to a silicon photonics-based optical transmission apparatus, and more particularly, an apparatus for controlling a crosstalk occurring by a slot mode generated in a metal electrode while reducing a loss of a signal in a travelling-wave Mach-Zehnder optical modulator.

2. Description of the Related Art

To accommodate data traffic that is continuously increasing in a data center, numerous efforts are being made to increase a transmission capacity of an optical interconnection. For the optical interconnection with a low cost and high capacity, a silicon photonic integrated circuit (PIC) may be used as an optimal solution because of its effects such as high integration, low power, and compatibility with a complementary metal-oxide-semiconductor (CMOS) process.

Among various optical devices of the silicon PIC, a silicon optical modulator may be a core functional device used to convert an electrical signal to an optical signal. A Mach-Zehnder optical modulator that is durable in a manufacturing process and at an ambient temperature has been employed more in the related industries. The Mach-Zehnder optical modulator may split input continuous wave (CW) light into two silicon optical waveguides (or phase shifters), apply electrical signals of opposite phases to the two silicon optical waveguides or apply an electrical signal to one of the silicon optical waveguides, modulate phases of propagating light, combine the light, and modulate light intensity through an interference.

Most Mach-Zehnder optical modulators may use a differential driving method of modulating the light that propagates in both the optical waveguides to reduce a driving voltage and chirping. The Mach-Zehnder optical modulator may be classified into a lumped element optical modulator and a traveling-wave optical modulator, based on a driving method.

The lumped element Mach-Zehnder optical modulator may require electrical driver devices, the number of which may correspond to the number of separated metal electrodes, for driving. Each of such drivers may additionally require a precise time delay line to adjust a propagation speed of an electrical signal based on a propagation speed of an optical signal that propagates in the optical modulator, even though the drivers are monolithically integrated onto a single semiconductor chip. In addition, the power for driving may increase.

The traveling-wave Mach-Zehnder optical modulator may include two PN-doped optical waveguides, to each of which a metal electrode in a form of a ground-signal-ground (GSG) coplanar waveguide (CPW) may be connected. In general, a PN-doped optical waveguide may be disposed between a ground G and a signal S in a GSG metal electrode, and thus the optical waveguide may be disposed asymmetrically with respect to a signal metal electrode.

However, the traveling-wave Mach-Zehnder optical modulator may have an undesired slot mode generated, in addition to a CPW mode, in the metal electrodes, which results in a crosstalk occurring between the two modes. The CPW mode and the slot mode may have different propagation constants and may thus interfere with each other during propagation at different speeds. The interference between the two modes may greatly reduce a bandwidth. Such an issue may be intensified further by increasing a length to reduce a driving voltage of the traveling-wave Mach-Zehnder optical modulator.

SUMMARY

An aspect provides a silicon photonics-based optical transmission apparatus that eliminates a crosstalk occurring by a slot mode and generates only a coplanar waveguide (CPW) mode by connecting two ground electrodes connected to phase shifters included in a travelling-wave Mach-Zehnder optical modulator chip through a periodic metal pattern of a sub-substrate and a periodic solder bump.

Another aspect also provides a silicon photonics-based optical transmission apparatus that reduces complexity of an optical transmission end by driving a travelling-wave Mach-Zehnder optical modulator chip through a single driver.

According to an aspect, there is provided a silicon photonics-based optical transmission apparatus including an optical modulator chip of a ground-signal-ground (GSG) electrode array including two phase shifters for differential driving, a sub-substrate including a metal electrode of a periodic pattern to connect two ground metal electrodes to each other at a GSG electrode connected to each of the two phase shifters, and a solder bump having a same periodic pattern as the metal electrode of the sub-substrate to connect the ground metal electrodes of the optical modulator chip and the metal electrode of the periodic pattern of the sub-substrate.

The metal electrode included in the sub-substrate may be formed based on a length corresponding to a period shorter than a central wavelength of an electrical signal input from an outside.

The sub-substrate may be formed with a silicon material to release heat generated in the optical modulator chip.

A space between the optical modulator chip and the sub-substrate may be filled with an underfill material, a highly resistive material, or air.

The optical modulator chip and the sub-substrate may include an alignment point (AP) for flip-chip bonding.

The two phase shifters included in the optical modulator chip are implemented in a silicon-on-insulator (SOI) wafer or a silicon wafer in which a SOI is locally formed.

According to another aspect, there is provided a silicon photonics-based optical transmission apparatus including an optical modulator chip of a GSG electrode array including two phase shifters for differential driving, a sub-substrate including a metal electrode of a periodic pattern to connect two ground metal electrodes to each other at a GSG electrode connected to each of the two phase shifters, and a solder bump having a same periodic pattern as the metal electrode of the sub-substrate to connect the ground metal electrodes of the optical modulator chip and the metal electrode of the periodic pattern of the sub-substrate. The metal electrode of the periodic pattern included in the sub-substrate may be connected to another metal electrode or formed as a single metal layer.

The metal electrode included in the sub-substrate may be formed based on a length corresponding to a period shorter than a central wavelength of an electrical signal input from an outside.

The sub-substrate may be formed with a silicon material to release heat generated in the optical modulator chip.

A space between the optical modulator chip and the sub-substrate may be filled with an underfill material, a highly resistive material, or air.

The optical modulator chip and the sub-substrate may include an AP for flip-chip bonding.

The two phase shifters included in the optical modulator chip may be implemented in a SOI wafer or a silicon wafer in which a SOI is locally formed.

According to another aspect, there is provided a silicon photonics-based optical transmission apparatus including an optical modulator chip of a GSG electrode array including two phase shifters for differential driving, a sub-substrate including a metal electrode of a periodic pattern to connect two ground metal electrodes to each other at a GSG electrode connected to each of the two phase shifters, and a solder bump having a same periodic pattern as the metal electrode of the sub-substrate to connect the ground metal electrodes of the optical modulator chip and the metal electrode of the periodic pattern of the sub-substrate. The ground metal electrodes in the GSG electrode of the optical modulator chip have an oxide open region formed based on a same periodic pattern of the metal electrode included in the sub-substrate.

An input pad region included in the GSG electrode of the optical modulator chip may be connected to an electrical signal input metal electrode of the sub-substrate through the solder bump such that an electrical signal is input from the sub-substrate to the optical modulator chip.

The metal electrode included in the sub-substrate may be formed based on a length corresponding to a period shorter than a central wavelength of an electrical signal input from an outside.

The sub-substrate may be formed with a silicon material to release heat generated in the optical modulator chip.

A space between the optical modulator chip and the sub-substrate may be filled with an underfill material, a highly resistive material, or air.

The optical modulator chip and the sub-substrate may include an AP for flip-chip bonding.

The two phase shifters included in the optical modulator chip may be implemented in a SOI wafer or a silicon wafer in which a SOI is locally formed.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
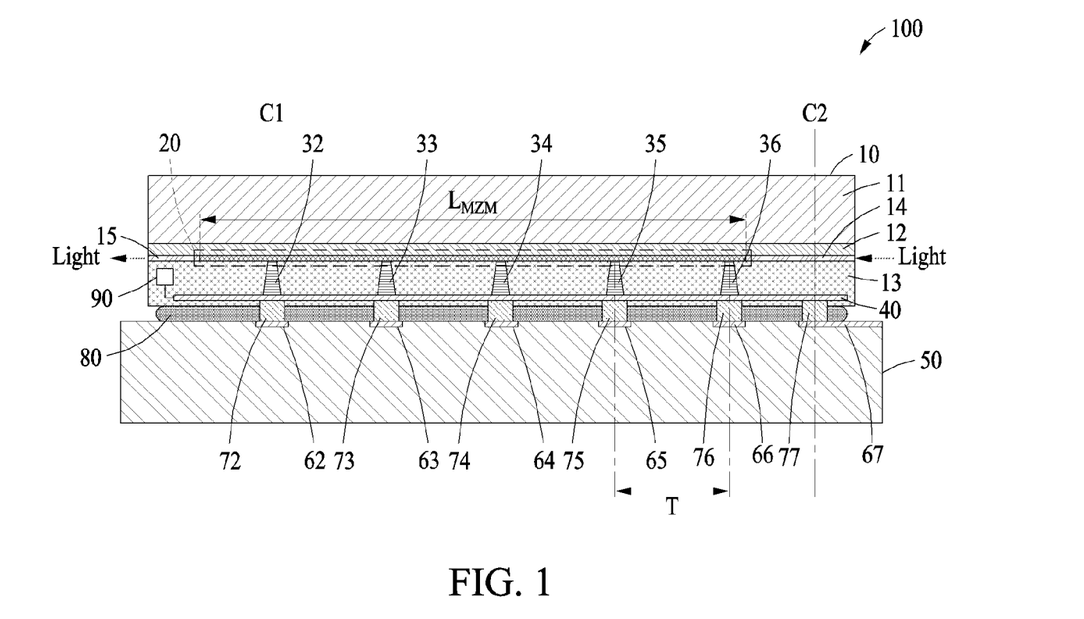
FIGS. 1 through 3 are diagrams illustrating examples of a structure of a silicon photonics-based optical transmission apparatus according to example embodiments.
Figure 2:
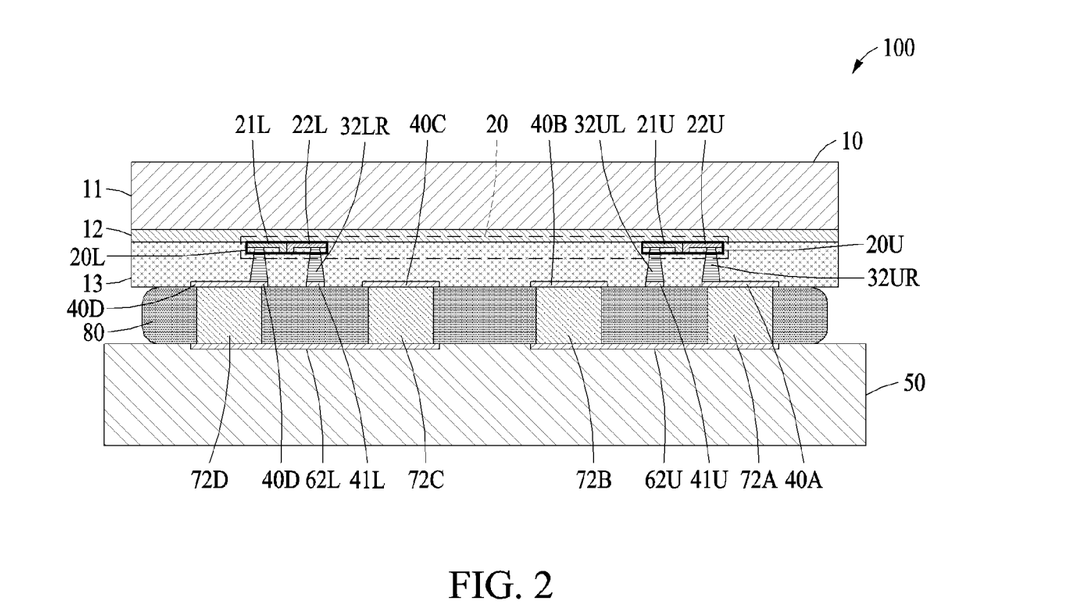
Figure 3:
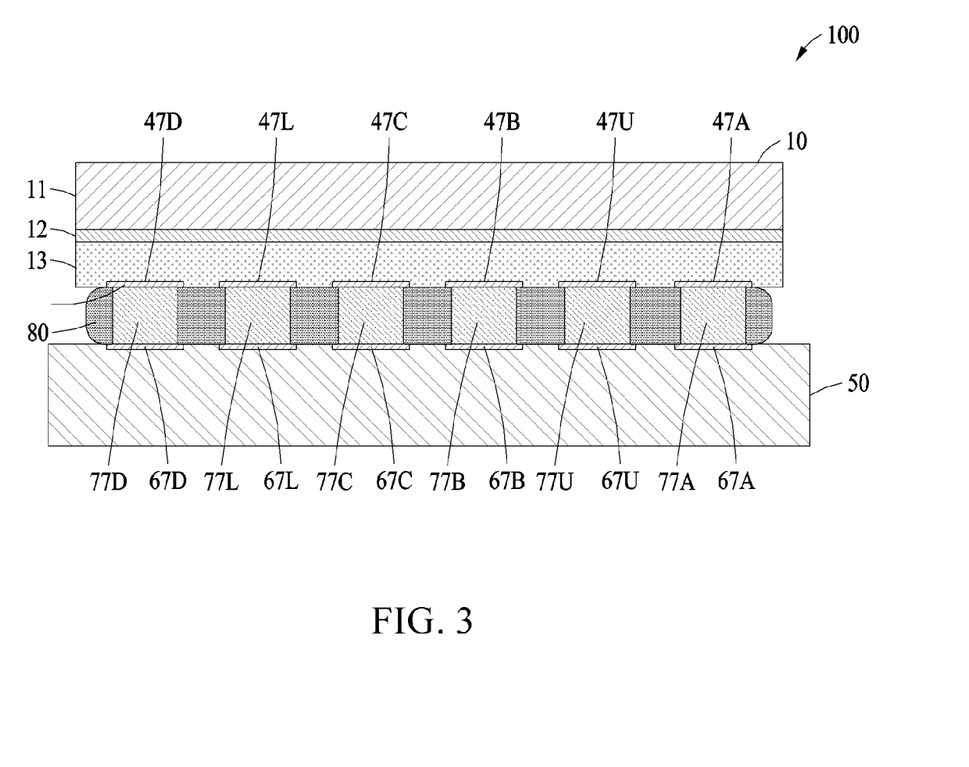

FIGS. 1 through 3 are diagrams illustrating examples of a structure of a silicon photonics-based optical transmission apparatus according to example embodiments.

In detail, FIG. 1 illustrates a side view of a silicon photonics-based optical transmission apparatus 100, FIG. 2 illustrates a cross-sectional view of the silicon photonics-based optical transmission apparatus 100 observed based on a C1 line, and FIG. 3 illustrates a cross-sectional view of the silicon photonics-based optical transmission apparatus 100 observed based on a C2 line.

The silicon photonics-based optical transmission apparatus 100, hereinafter simply the optical transmission apparatus 100, may include a travelling-wave Mach-Zehnder optical modulator chip 10 of a ground-signal-ground (GSG)-GSG electrode array that includes two phase shifters 20 implemented in a silicon-on-insulator (SOI) wafer or a silicon wafer on which an SOI is locally formed for differential driving, a sub-substrate 50 for flip-chip bonding that includes periodic metal patterns, for example, periodic metal patterns 62 through 66, to connect two ground metal electrodes 40 to each other at a GSG electrode connected to each of the phase shifters 20, and periodic solder bumps, for example, solder bumps 72 through 76, that connect the two ground metal electrodes 40 of the travelling-wave Mach-Zehnder optical modulator chip 10 and the periodic metal patterns 62 through 66 of the sub-substrate 50.

Referring to FIG. 1, the two phase shifters 20 included in the travelling-wave Mach-Zehnder optical modulator chip 10 of the optical transmission apparatus 100 may be implemented on an SOI wafer or a silicon wafer on which a SOI is locally formed. The travelling-wave Mach-Zehnder optical modulator chip 10 may modulate continuous wave (CW) light that is input to an input silicon waveguide 14 into an electrical signal and output the electrical signal through an output silicon waveguide 15. The optical transmission apparatus 100 may be described herein based on a case in which light is input to and output from two edge sides of a chip. However, a position or a shape of an input and output port may change based on a coupling method. In such a case, a length of each of the phase shifters 20 may be indicated as $L_{MZM}$.

The SOI wafer that is generally used may be of a stacked form on which a silicon substrate 11 having a thickness of 725 micrometers (μm) or less, buried oxide (BOX) 12 having a thickness of 2 to 3 μm, and a silicon waveguide layer 14 or 15 having a thickness of 200 to 400 nanometers (nm) are stacked, and may include cladding oxide 13 and metal electrodes, for example, the ground electrodes 40 or a signal electrode 41, that are formed through a back-end-of-line (BEOL) process. In FIG. 1, only one ground electrode is illustrated among a plurality of ground electrodes, without a signal electrode illustrated.

The phase shifters 20 may be connected to the metal electrodes, for example, the ground electrodes 40 or the signal electrode 41 (not shown in the side view of FIG. 1), through silicon-metal vias, for example, silicon-metal vias 32 through 36, and a termination resistor 90 generally having a value of 50 ohm (Ω) may be disposed at an end of each of the metal electrodes. The travelling-wave Mach-Zehnder optical modulator chip 10 may be flip-chip bonded to the sub-substrate 50 including the periodic metal patterns 62 through 66. A period T may need to be shorter than a central wavelength of an electrical signal, and may generally correspond to a length that is 1/8 or less of the central wavelength.

The sub-substrate 50 for flip-chip bonding may be formed with a silicon material. The electrical signal input from an outside may be input to the metal electrodes, for example, the ground electrodes 40 or the signal electrode 41, of the travelling-wave Mach-Zehnder optical modulator chip 10 through an electrical signal input metal electrode 67 formed in the sub-substrate 50 for flip-chip bonding and an electrical signal input solder bump 77.

The periodic metal patterns 62 through 66 of the sub-substrate 50 for flip-chip bonding and the two ground metal electrodes 40 in the GSG electrode connected to the phase shifters 20 of the travelling-wave Mach-Zehnder optical modulator chip 10 may be connected through the periodic solder bumps 72 through 76. A space between the travelling-wave Mach-Zehnder optical modulator chip 10 and the sub-substrate 50 for flip-chip bonding may be filled with an underfill material 80 to improve mechanical stability and thermal conductivity or filled with a highly resistive material or air to reduce a loss of a radio frequency (RF) signal. The periodic solder bumps 72 through 76 may each have a diameter of 50 μm and a height of 30 μm, in general.

Referring to FIG. 2, the two phase shifters 20 included in the travelling-wave Mach-Zehnder optical modulator chip 10 of the optical transmission apparatus 100 may include a PN junction phase shifter U 20U and a PN junction phase shifter L 20L that are to be differentially driven in a form of a GSG-GSG electrode. A phase shifter U described herein may be an "upper" phase shifter and a phase shifter L described herein may be a "lower" phase shifter, and each may have a form of a GSGSG electrode in addition to the GSG-GSG electrode form.

The phase shifter 20U may be connected to a GSG-coplanar waveguide (CPW) electrode including a signal electrode 41U and two ground electrodes, for example, a ground electrode 40A and a ground electrode 40B. The signal electrode 41U may be in an ohmic contact with an N-type silicon 21U of the phase shifter 20U through a silicon-metal via 32UL, and the ground electrode 40A may be in an ohmic contact with a P-type silicon 22U of the phase shifter 20U through a silicon-metal via 32UR.

The two ground electrodes 40A and 40B connected to the phase shifter 20U of the travelling-wave Mach-Zehnder optical modulator chip 10 may be connected to a metal layer 62U among the periodic metal patterns 62 through 66 of the sub-substrate 50 through periodic solder bumps 72A and 72B among the periodic solder bumps 72 through 76. Thus, the two ground electrodes 40A and 40B may continuously maintain the same electrical potential and may thus allow only a CPW mode to be formed by preventing a slot mode, thereby eliminating a crosstalk occurring by the slot mode and securing a wide bandwidth.

The phase shifter 20L may have the same structure and operating characteristics as those of the phase shifter 20U, and a detailed description of the phase shifter 20L will thus be omitted.

Referring to FIG. 3, electrical signal input metal electrodes 67A, 67U, 67B, 67C, 67L and 67D of the sub-substrate 50 included in the silicon photonics-based optical transmission apparatus 100 may be respectively connected to input pad regions 47A, 47U, 47B, 47C, 47L, and 47D for the metal electrodes, for example, the ground electrodes 40 or the signal electrode 41, of the travelling-wave Mach-Zehnder optical modulator chip 10 through electrical signal input solder bumps 77A, 77U, 77B, 77C, 77L, and 77D, respectively.

The input pad regions 47A, 47U, 47B, 47C, 47L, and 47D for the metal electrode, for example, the ground electrodes 40 or the signal electrode 41, of the travelling-wave Mach-Zehnder optical modulator chip 10 may be electrically connected to metal electrodes 40A, 41U, 40B, 40C, 41L, and 40D of the travelling-wave Mach-Zehnder optical modulator chip 10, respectively. Through the connection, an electrical signal may be input from the sub-substrate 50 to the travelling-wave Mach-Zehnder optical modulator chip 10.

FIGS. 4 through 7 are diagrams illustrating examples of a flip-chip bonded side between the travelling-wave Mach-Zehnder optical modulator chip 10 and the sub-substrate 50 in the optical transmission apparatus 100 according to example embodiments.

Figure 4:
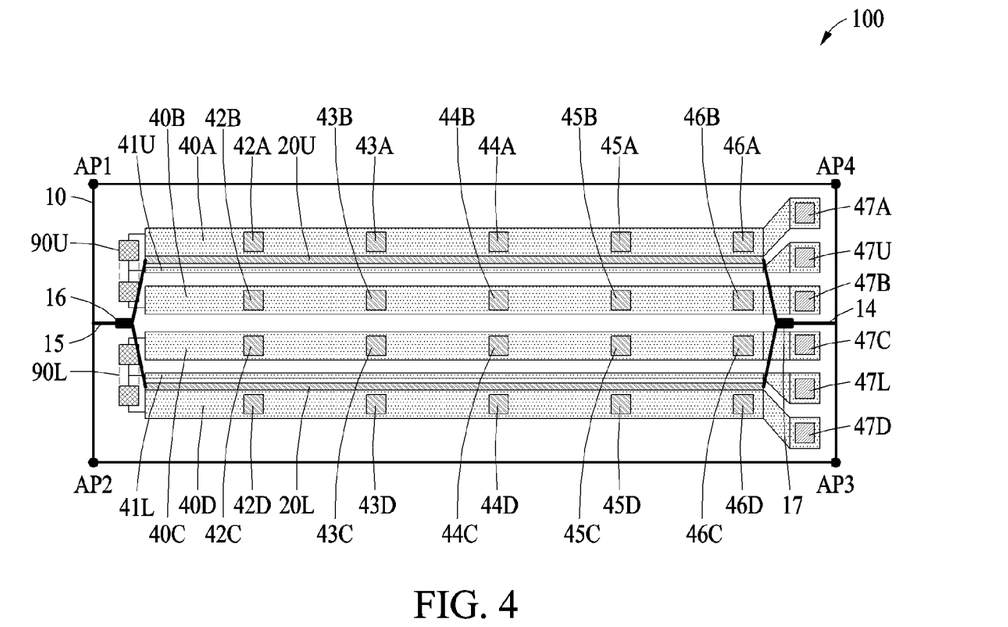
FIGS. 4 through 7 are diagrams illustrating examples of a flip-chip bonded side between a travelling-wave Mach-Zehnder optical modulator chip and a sub-substrate in a silicon photonics-based optical transmission apparatus according to example embodiments.
Figure 5:
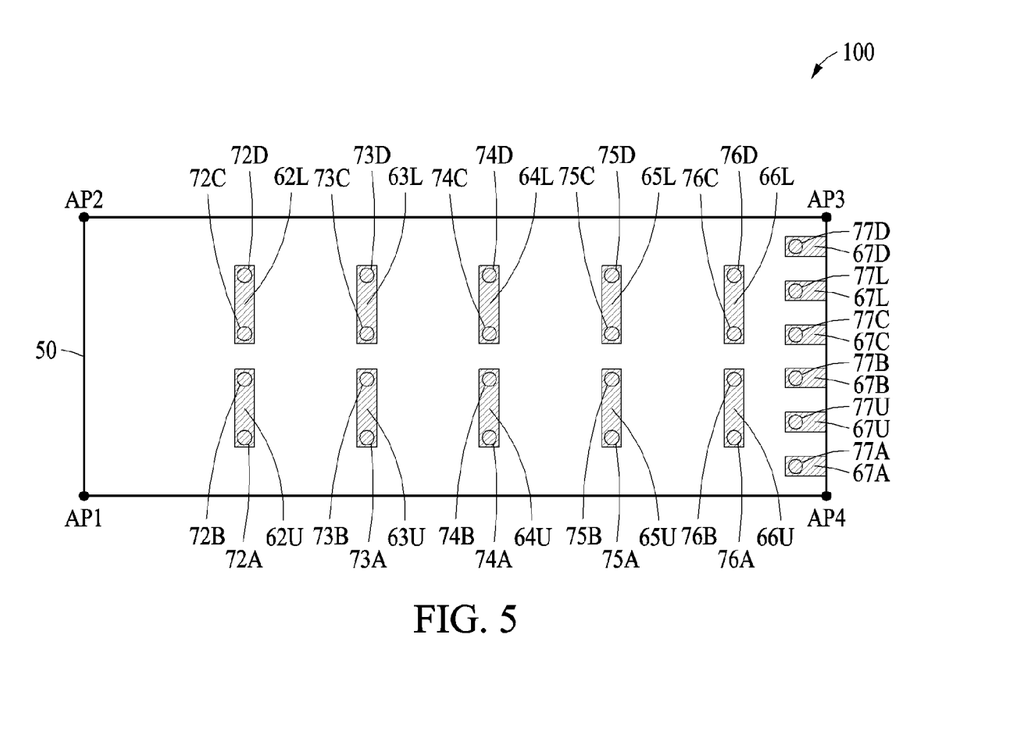
Figure 6:
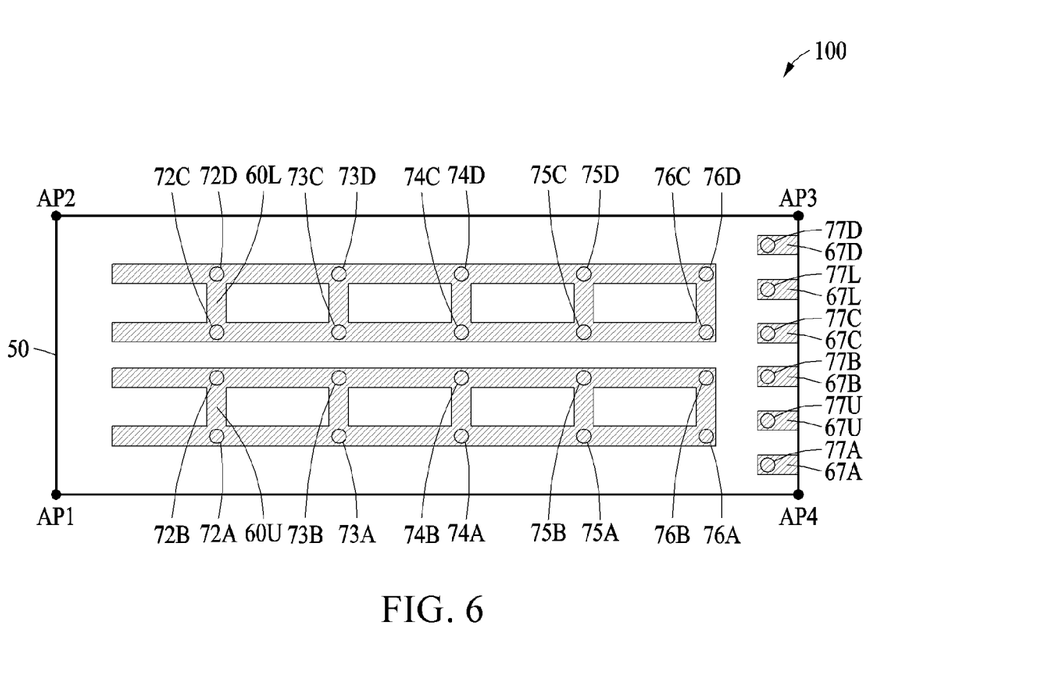
Figure 7:
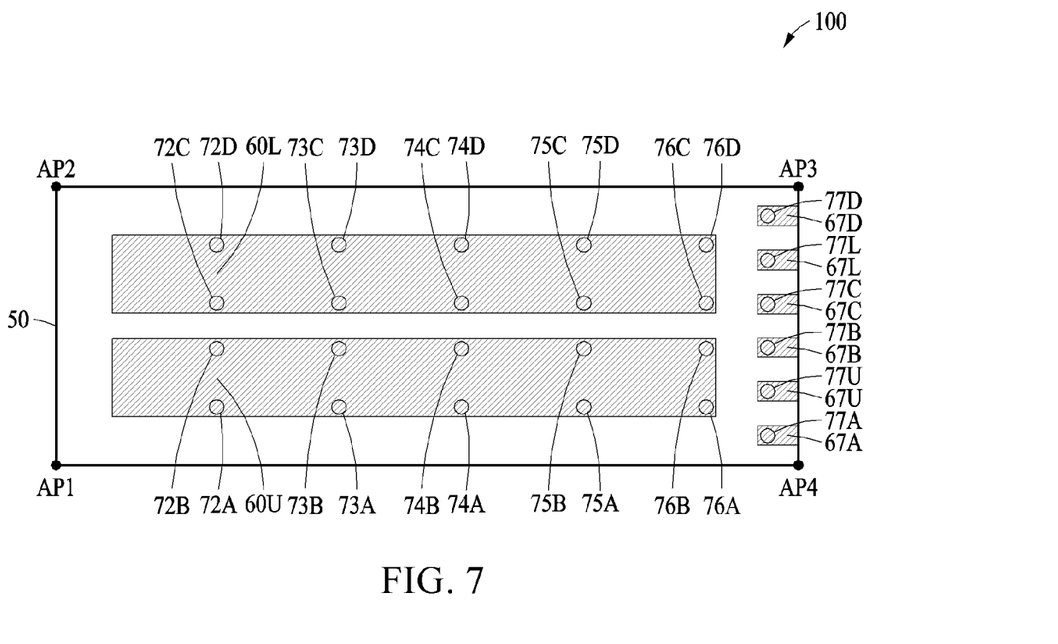

The travelling-wave Mach-Zehnder optical modulator chip 10 illustrated in FIG. 4 and the sub-substrate 50 illustrated in FIGS. 5 through 7 may be flip-chip bonded using alignment points (AP) AP1 through AP4.

To flip-chip bond the periodic metal patterns 62 through 66 included in the sub-substrate 50 and the periodic solder bumps 72 through 76, oxide open regions 42 through 46 may be formed in the ground metal electrodes 40 of the travelling-wave Mach-Zehnder optical modulator chip 10. In general, a silicon optical modulator chip may be passivated with an oxide layer, and such an oxide layer may need to be removed on a periodic basis through an oxide open process for an electrical connection.

In addition, from the input pad regions 47A, 47U, 47B, 47C, 47L, and 47D of the travelling-wave Mach-Zehnder optical modulator chip 10 for inputting an electrical signal from the sub-substrate 50 to the travelling-wave Mach-Zehnder optical modulator chip 10, cladding oxide on an electrode may be removed through the oxide open process. A high-speed electrical signal that is input through the input pad regions 47A, 47U, 47B, 47C, 47L, and 47D of the travelling-wave Mach-Zehnder optical modulator chip 10 may be modulated into an optical signal while propagating through the phase shifter 20U and the phase shifter 20L of the travelling-wave Mach-Zehnder optical modulator chip 10.

In the travelling-wave Mach-Zehnder optical modulator chip 10, the two optical couplers 14 and 15 may be disposed to perform a function of splitting and combining input light.

The optical transmission apparatus 100 may continuously maintain the same electrical potential because the ground metal electrodes 40A and 40B connected to the phase shifter 20U are electrically connected by the periodic metal patterns 62U through 66U of the sub-substrate 50 and the periodic solder bumps 72A through 76A and 72B through 76B, thereby preventing a slot mode from being generated and generating only a CPW mode.

Similarly, the optical transmission apparatus 100 may continuously maintain the same electrical potential because the two ground metal electrodes 40C and 40D connected to the phase shifter 20L are electrically connected by the periodic metal patterns 62L through 66L of the sub-substrate 50 and the periodic solder bumps 72C through 76C and 72D through 76D, thereby preventing the slot mode from being generated and generating only the CPW mode. Thus, the optical transmission apparatus 100 may eliminate a crosstalk occurring by the slot mode and secure a wide bandwidth.

To decrease a driving voltage of the travelling-wave Mach-Zehnder optical modulator chip 10, a length $L_{MZM}$ of a modulator may be increased, which may lead to a more degrading performance due to the slot mode. Thus, example embodiments described herein may be more effective in implementing a low voltage optical modulator having a long length.

In addition, heat generated in the travelling-wave Mach-Zehnder optical modulator chip 10 including a termination resistor may be released from the sub-substrate 50 through the periodic solder bumps 72 through 76, and it is thus possible to achieve thermal stability. In general, the travelling-wave Mach-Zehnder optical modulator chip 10 may be manufactured with an SOI wafer, and the heat may thus be blocked by the BOX layer 12 and not be released to the silicon substrate 11. However, such an issue may be solved by the structure described herein.

In such a case, the periodic metal patterns 60L and 60U of the sub-substrate 50 may be connected as illustrated in FIG. 6 or may be formed as a single wide metal layer as illustrated in FIG. 7.

According to example embodiments, it is possible to eliminate a crosstalk occurring by a slot mode and generate only a CPW mode by connecting two ground electrodes connected to phase shifters included in a travelling-wave Mach-Zehnder optical modulator chip through a periodic metal pattern of a sub-substrate and a periodic solder bump.

According to example embodiments, it is also possible to reduce complexity of an optical transmission end by driving a travelling-wave Mach-Zehnder optical modulator chip through a single driver.

According to example embodiments, it is also possible to improve temperature stability by connecting a ground electrode of a travelling-wave Mach-Zehnder optical modulator chip and a sub-substrate and effectively releasing heat generated in the travelling-wave Mach-Zehnder optical modulator chip.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

In the meantime, the method according to an example embodiment may be implemented as various recording media such as a magnetic storage medium, an optical read medium, and a digital storage medium after being implemented as a program that can be executed in a computer.

The implementations of the various technologies described in the specification may be implemented with a digital electronic circuit, computer hardware, firmware, software, or the combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. The computer programs such as the above-described computer program(s) may be recorded in any form of a programming language including compiled or interpreted languages, and may be executed as a standalone program or in any form included as another unit suitable to be used in a module, component, sub routine, or a computing environment. The computer program may be executed to be processed on a single computer or a plurality of computers at one site or to be distributed across a plurality of sites and then interconnected by a communication network.

The processors suitable to process a computer program include, for example, both general purpose and special purpose microprocessors, and any one or more processors of a digital computer of any kind. Generally, the processor may receive instructions and data from a read only memory, a random-access memory or both of a read only memory and a random-access memory. The elements of a computer may include at least one processor executing instructions and one or more memory devices storing instructions and data. In general, a computer may include one or more mass storage devices storing data, such as a magnetic disk, a magneto-optical disc, or an optical disc or may be coupled with them so as to receive data from them, to transmit data to them, or to exchange data with them. For example, information carriers suitable to embody computer program instructions and data include semiconductor memory devices, for example, magnetic Media such as hard disks, floppy disks, and magnetic tapes, optical Media such as compact disc read only memory (CD-ROM), and digital video disc (DVD), magneto-optical media such as floppy disks, ROM, random access memory (RAM), flash memory, erasable programmable ROM (EPROM), electrically erasable programmable ROM (EEPROM), and the like. The processor and the memory may be supplemented by a special purpose logic circuit or may be included by the special purpose logic circuit.

Furthermore, the computer-readable medium may be any available medium capable of being accessed by a computer and may include a computer storage medium.

Although the specification includes the details of a plurality of specific implementations, it should not be understood that they are restricted with respect to the scope of any subject matter or claimable matter. On the contrary, they should be understood as the description about features that may be specific to the specific example embodiment of a specific disclosure. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

In the meantime, example embodiments disclosed in the specification and drawings are simply the presented specific example to help understand an example embodiment of the present disclosure and not intended to limit the scopes of example embodiments of the present disclosure. It is obvious to those skilled in the art that other modifications based on the technical idea of the present disclosure may be performed in addition to the example embodiments disclosed herein.

What is claimed is:

1. A silicon photonics-based optical transmission apparatus, comprising:
   an optical modulator chip of a ground-signal-ground (GSG) electrode array comprising two phase shifters for differential driving;
   a sub-substrate comprising a metal electrode of a periodic pattern to connect two ground metal electrodes to each other at a GSG electrode connected to each of the two phase shifters; and
   a solder bump having a same periodic pattern as the metal electrode of the sub-substrate to connect the ground metal electrodes of the optical modulator chip and the metal electrode of the periodic pattern of the sub-substrate.

2. The apparatus of claim 1, wherein the metal electrode comprised in the sub-substrate is formed based on a length corresponding to a period shorter than a central wavelength of an electrical signal input from an outside.

3. The apparatus of claim 1, wherein the sub-substrate is formed with a silicon material to release heat generated in the optical modulator chip.

4. The apparatus of claim 1, wherein a space between the optical modulator chip and the sub-substrate is filled with an underfill material, a highly resistive material, or air.

5. The apparatus of claim 1, wherein the optical modulator chip and the sub-substrate comprise an alignment point (AP) for flip-chip bonding.

6. The apparatus of claim 1, wherein the two phase shifters comprised in the optical modulator chip are implemented in a silicon-on-insulator (SOI) wafer or a silicon wafer in which a SOI is locally formed.

7. A silicon photonics-based optical transmission apparatus, comprising:
   an optical modulator chip of a ground-signal-ground (GSG) electrode array comprising two phase shifters for differential driving;
   a sub-substrate comprising a metal electrode of a periodic pattern to connect two ground metal electrodes to each other at a GSG electrode connected to each of the two phase shifters; and
   a solder bump having a same periodic pattern as the metal electrode of the sub-substrate to connect the ground metal electrodes of the optical modulator chip and the metal electrode of the periodic pattern of the sub-substrate,
      wherein the metal electrode of the periodic pattern comprised in the sub-substrate is connected to another metal electrode or formed as a single metal layer.

8. The apparatus of claim 7, wherein the metal electrode comprised in the sub-substrate is formed based on a length corresponding to a period shorter than a central wavelength of an electrical signal input from an outside.

9. The apparatus of claim 7, wherein the sub-substrate is formed with a silicon material to release heat generated in the optical modulator chip.

10. The apparatus of claim 7, wherein a space between the optical modulator chip and the sub-substrate is filled with an underfill material, a highly resistive material, or air.

11. The apparatus of claim 7, wherein the optical modulator chip and the sub-substrate comprise an alignment point (AP) for flip-chip bonding.

12. The apparatus of claim 7, wherein the two phase shifters comprised in the optical modulator chip are implemented in a silicon-on-insulator (SOI) wafer or a silicon wafer in which a SOI is locally formed.

13. A silicon photonics-based optical transmission apparatus, comprising:
   an optical modulator chip of a ground-signal-ground (GSG) electrode array comprising two phase shifters for differential driving;
   a sub-substrate comprising a metal electrode of a periodic pattern to connect two ground metal electrodes to each other at a GSG electrode connected to each of the two phase shifters; and
   a solder bump having a same periodic pattern as the metal electrode of the sub-substrate to connect the ground metal electrodes of the optical modulator chip and the metal electrode of the periodic pattern of the sub-substrate,
      wherein the ground metal electrodes in the GSG electrode of the optical modulator chip have an oxide open region formed based on a same periodic pattern of the metal electrode comprised in the sub-substrate.

14. The apparatus of claim 13, wherein an input pad region comprised in the GSG electrode of the optical modulator chip is connected to an electrical signal input metal electrode of the sub-substrate through the solder bump such that an electrical signal is input from the sub-substrate to the optical modulator chip.

15. The apparatus of claim 13, wherein the metal electrode comprised in the sub-substrate is formed based on a length corresponding to a period shorter than a central wavelength of an electrical signal input from an outside.

16. The apparatus of claim 13, wherein the sub-substrate is formed with a silicon material to release heat generated in the optical modulator chip.

17. The apparatus of claim 13, wherein a space between the optical modulator chip and the sub-substrate is filled with an underfill material, a highly resistive material, or air.

18. The apparatus of claim 13, wherein the optical modulator chip and the sub-substrate comprise an alignment point (AP) for flip-chip bonding.

19. The apparatus of claim 13, wherein the two phase shifters comprised in the optical modulator chip are implemented in a silicon-on-insulator (SOI) wafer or a silicon wafer in which a SOI is locally formed.

* * * * *